United States Patent [19]
Löfgren

[11] Patent Number: 6,006,629
[45] Date of Patent: Dec. 28, 1999

[54] AUTOMATIC CHAIN SHARPENING DEVICE MOUNTED ON A CHAIN SAW

[75] Inventor: Per-Olof Löfgren, Vallsta, Sweden

[73] Assignee: Sandvik Aktiebolag, Sandviken, Sweden

[21] Appl. No.: 09/104,214

[22] Filed: Jun. 25, 1998

[30] Foreign Application Priority Data

Jun. 27, 1997 [SE] Sweden ................... 9702479

[51] Int. Cl.⁶ .......................... B23D 63/16; B27B 17/02
[52] U.S. Cl. ................... 76/80.5; 76/37; 83/833; 83/834
[58] Field of Search ............. 76/37, 80.5; 83/833, 83/834; 30/138, 381

[56] References Cited

U.S. PATENT DOCUMENTS

| | | | |
|---|---|---|---|
| 2,821,097 | 1/1958 | Carlton | 76/80.5 |
| 3,144,059 | 8/1964 | Oehrli | 83/833 |
| 3,147,644 | 9/1964 | Oehrli | 76/37 |
| 3,170,497 | 2/1965 | Ehlen et al. | 83/833 |
| 3,176,733 | 4/1965 | Dobbertin | 83/834 |
| 3,189,064 | 6/1965 | Frederickson | 83/834 |
| 3,269,431 | 8/1966 | Ehlen | 76/37 |
| 3,502,122 | 3/1970 | Silvon | 76/37 |
| 3,534,638 | 10/1970 | Van Ourkerk | 76/37 |
| 3,921,490 | 11/1975 | Dolata et al. | 83/833 |
| 4,492,030 | 1/1985 | Beerens | 83/834 |
| 4,593,591 | 6/1986 | Beerens | 83/833 |

*Primary Examiner*—Hwei-Siu Payer
*Attorney, Agent, or Firm*—Burns, Doane, Swecker & Mathis, L.L.P.

[57] ABSTRACT

A saw chain is automatically sharpened during use by causing top sides of the cutter links to be pressed against a stationary abrasive block when the saw chain is running around a rim type sprocket. The cutting link includes a cutting edge, and a depth gauge recessed radially from the cutting edge by a distance defining the cutting depth. The generally cylindrical outer periphery of the drive sprocket has raised steps or ramps formed thereon which lift the front end of the cutter links relative to the rear ends, thereby allowing a sufficiently large cutting depth to be achieved without locating the depth gauge far in front of the front rivet. This reduces vibration and instability of the saw chain when sawing.

4 Claims, 2 Drawing Sheets

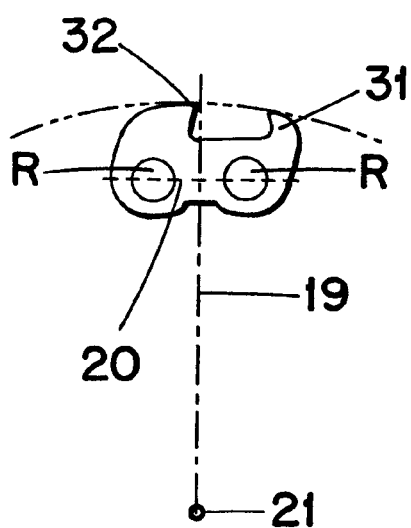
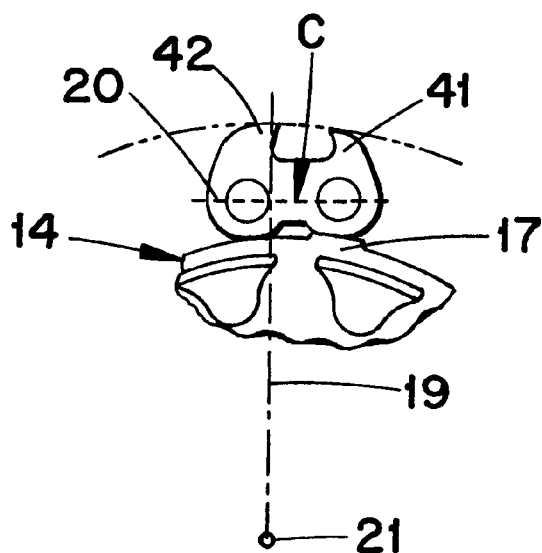
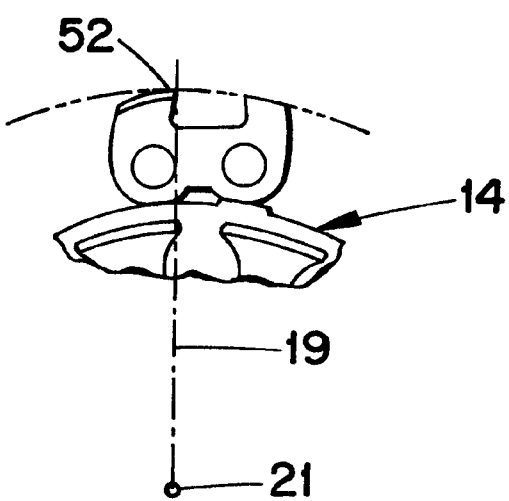

AUTOMATIC CHAIN SHARPENING DEVICE MOUNTED ON A CHAIN SAW

BACKGROUND OF THE INVENTION

The invention relates to chain saw-mounted grinding devices for automatically grinding a saw chain while the saw chain is being driven.

A majority of chain saws have chains, the cutter links of which have one cutter and one depth gauge for limiting the cutting depth and the risk of uncontrollable kick-back and impacts. These chains are sharpened by filing or grinding the front rake face of the cutter. Since the rear clearance face of the cutter has a certain small clearance angle this will lower the edge, requiring lowering also of the depth gauge by filing, which is difficult to do with sufficient precision.

Special chains have been previously suggested, designed for automatic resharpening and height adjustment of the depth gauge with high precision by grinding devices without removing the chain from the chain saw. According to the U.S. Pat. No. 3,147,644 and U.S. Pat. No. 3,502,122 and others, a grinding device has been located immediately behind the drive sprocket of the chain, and will grind both the cutter and the depth gauge simultaneously as the chain is running around the drive sprocket. Relative to the cutter link, the grinding device will follow a circular path, the highest point of which is located where a radius from the center of the drive sprocket forms a 90 degree angle with a line passing through both of the cutter link-connecting rivets R (see FIG. 3). With normal links and sprockets, that radius and line intersect at the center of the link, as shown in FIG. 3.

That is, in grinding devices according to the prior art, the cutter links run with both of their connecting rivets R spaced at the same distance from the sprocket center (21), and as shown in FIG. 3 the radius (19) extending at 90 degrees to a line (20) passing through the rivets will pass through the center of the link. This means that in order to grind the depth gauge (31) lower than the cutter (32) that corresponds to the desired chip thickness, the depth gauge (31) will have to be located very far forward, and the cutting edge of the cutter (32) located close to the radius (19) at the center of the link.

To keep the depth gauge lower than the cutter edge by an amount that corresponds to the desired cutting depth, the depth gauge must be located at a greater distance from this radius than is the cutter edge, and to get a positive clearance angle the cutting edge must be located behind the radius, as is shown by the U.S. Pat. No. 3,147,644 and U.S. Pat. No. 3,170,497 and others. For hand-held chain saws a positive clearance angle is necessary since the available feed force is limited, which means that even with a small diameter of the drive sprocket the distance between the depth gauge and the cutter edge must be rather large. This increases the risk for kick-back and violent jerks when sawing thin branches or when a tree moves. Safety requirements have thus excluded such grinding devices from the market.

For vehicle-born chain saws the problems are different. The drive sprocket diameter must be kept rather large to keep the motor velocity and the sprocket wear low. To utilize the motor power the cutting depth should be larger than with hand-held chain saws, which would require a very long distance between the depth gauge and the cutter. In actual cases the depth gauge would have to be situated far in front of the front rivet, (see FIG. 3 and U.S. Pat. No. 3,170,497), which in turn might cause severe vibration and instability in service.

SUMMARY OF THE INVENTION

The present invention takes advantage of the nonexistent risk of kick-back and the availability of higher mechanized feed force that is characteristic of vehicle-born chain saws, to enable smaller or even negative clearance angles to be utilized. With a built-in grinding device according to the invention, a saw chain with known and generally approved cutter links can be used.

According to the invention, the chain saw is provided with a conventional grinding device disposed immediately behind the drive sprocket. The drive sprocket, however, is made in such a way that the front rivet of a cutter link rides around the sprocket on a larger diameter than the rear rivet. The radius from the sprocket center which forms a 90 degree angle with the line passing through both rivets will then pass behind the center of the link, whereby the required longer distance from the depth gauge to the radius can be achieved with stable links, in principle like those described in U.S. Pat. No. 3,170,497. The difference in diameter is chosen to make the radius intersect the line close to the cutter edge. Should the intersection lie behind the edge, the clearance angle will be slightly negative, which is acceptable for vehicle-born chain saws. For such a chain, all sharpening is done with the built-in-grinder.

The invention can also be used with a traditional saw chain having L-shaped cutters. These cutters are normally made with a hard chrome plated clearance face and are normally sharpened by filing the non-plated rake face. The chrome layer is then fractured at right angles to the clearance face, which causes unnecessarily large cutting forces. Local polishing or whetting of the chrome layer after filing may make the clearance angle very small or slightly negative, but will still improve the durability and reduce the cutting force.

According to the invention the front end of the cutter link with the depth gauge is raised, when the grinding device acts in a manner whetting the chrome layer. The part of the chrome layer which then becomes thinner is shorter than if the front end is not raised, which improves the durability. Whetting with a device according to the invention is especially suitable for cutter links with curved clearance face according to U.S. Pat. No. 3,144,059 or U.S. Pat. No. 3,176,733, where the whetted surface is mail even when repeated filing has moved the cutter edge close to the rear end of the cutter.

BRIEF DESCRIPTION OF THE DRAWING

The objects and advantages of the invention will become apparent from the following detailed description of preferred embodiments thereof in connection with the accompanying drawing in which like numerals designate like elements, and in which:

FIG. 3 shows how the cutter link of a top-sharpened chain according to the prior art must have the depth gauge located very far forward of the center of the link;

FIG. 4 shows how a corresponding link according lo the invention may have the depth gauge closer to the center of the link to improve stability; and FIG. 5 shows how the invention can be used for whetting the cutter edge of an L-shaped cutter after filing.

DETAILED DESCRIPTION OF PREFERRED EMBODIMENTS OF THE INVENTION

Figure 1:
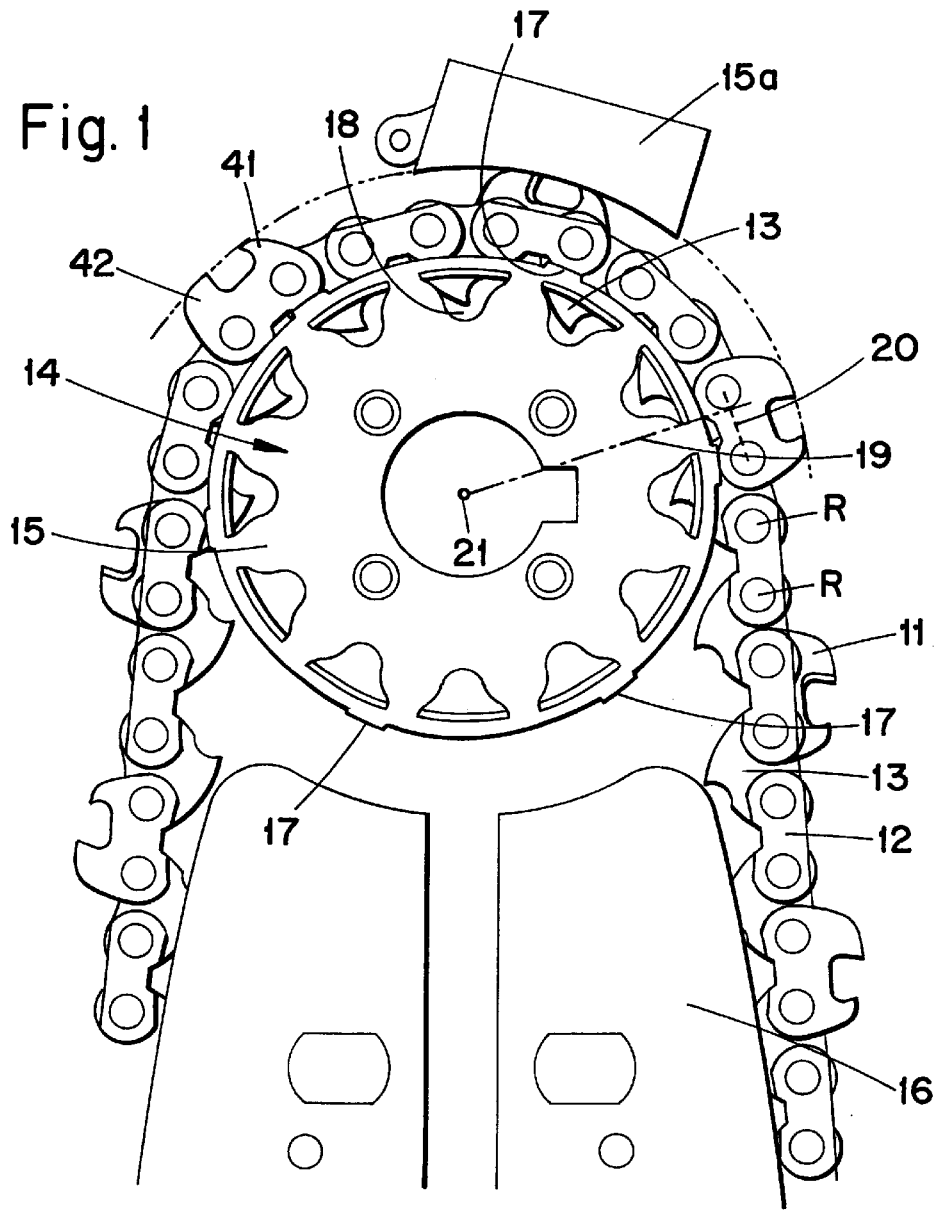
FIG. 1 shows one preferred embodiment of a chain saw drive sprocket.

FIG. 1 shows a saw chain comprising drive links (13), cutter links (11) and side links (12) without cutters. The saw chain runs around the edge of a guide bar (16) and at the rear end of the guide bar around a drive sprocket (14). Behind the drive sprocket there is an abrasive block (15a) which can be pressed against the top surfaces of the cutter links (11) to touch and grind the cutter edge as well as the depth gauge.

According to the invention, the drive sprocket (14) comprises a sprocket with two parallel side rims (15—only one side rim shown) which support the cutterlinks (11) and sidelinks (12). Between the rims there are disposed drive recesses (18) which are laterally open and radially open and into which the drive links (13) extend. The outer periphery of each of the drive sprocket rims (15) has circumferentially spaced, radially outwardly extending projections in the form of raised steps (17) (see FIG. 1) which, as shown in FIG. 4, engage and keep the front end of the cutter links (11) uplifted during grinding. The remaining portions of the outer peripheries of the rims are cylindrical. If the number of drive recesses (18) is even, it is suitable to provide one raised step (17) for every second recess; if the number of recesses is odd, there should be one raised step for each recess, since there is normally one cutter link (11) for every second drive link (13). The raised steps may have a uniform height as shown in FIG. 1, which makes the device less sensitive to wear and dimensional inaccuracy of the recesses, but causes concentrated point loads on the cutter links when grinding.

Figure 2:
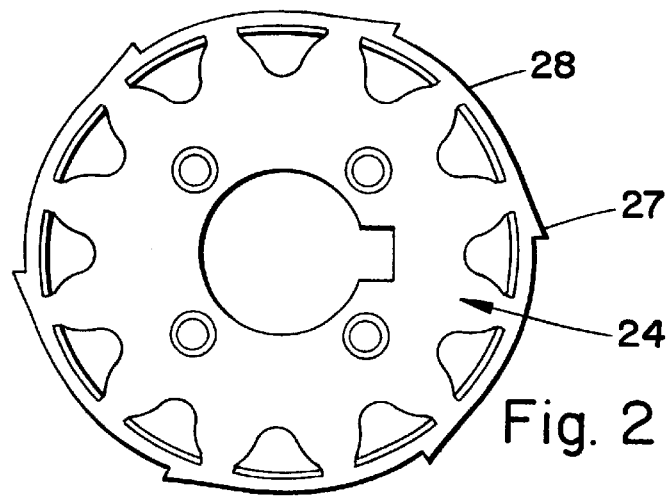
FIG. 2 shows an alternative embodiment of the drive sprocket.

As shown in FIG. 2, the outer periphery of the drive sprocket (24) alternatively could be provided with projections in the form of evenly sloping raised ramps (27) for fully supporting the cutter links during the grinding, with cylindrical sections (28) disposed between the ramps. The raised steps or ramps (17,27) should be arranged symmetrically on both side rims of the drive sprocket to support the cutter link (11) as well as the side link (12) riveted to the cutter link.

Since the front end of the cutter link is uplifted by the raised step (17) or ramp (27), the imaginary line (20) passing through both of the rivets will be sloping as compared to that of FIG. 3, and the 90 degree radius (19) will pass behind a midpoint C of the cutting line and lie close to the rear rivet, as shown in FIG. 4. This allows a more symmetric positioning of the cutter (42) and the depth gauge (41) relative to the rivets and the center of the cutter link, compared to what was shown in U.S. Pat. No. 3,170,497, resulting in a stable motion of the saw chain even with greater cutting depth. This is especially valuable for saws driven by hydraulic motors, for which large diameter drive sprockets are desirable.

The cutter links shown in FIGS. 3 and 4 have been of a type sharpened only through grinding of the clearance face on top of the cutter (42) as described in U.S. Pat. No. 3,170,497, where the cutter edge is insignificantly moved in a longitudinal direction by repeated grinding. As shown in FIG. 5, devices according to the invention can also be used with saw chains having L-shaped cutters (52) for whetting the clearance face of the cutter edge between or after filings of the rake face. These saw chains have usually a thin hard chrome layer on the clearance face, and to avoid the removing of too much of this layer when whetting, the clearance face should be sloping enough to let the whetting occur only at a narrow zone near the edge, and preferably be slightly curved as shown in U.S. Pat. No. 3,176,733.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A chain saw comprising: a drive sprocket, a guide bar disposed adjacent the drive sprocket, a saw chain extending around outer peripheries of the drive sprocket and the guide bar, and an abrasive block arranged adjacent to the drive sprocket for grinding top sides of cutter links of the saw chain as the saw chain travels in a forward direction relative to the abrasive block; each cutter link including front and rear ends, the front end providing a depth gauge portion and the rear end providing a cutting portion; the outer periphery of the drive sprocket being generally cylindrical and including circumferentially spaced projections for orienting the cutter links in a grinding position, each projection extending generally radially outwardly and positioned for engaging and lifting the front end of a respective cutter link relative to the rear end thereof during travel of the cutter link around the drive sprocket, whereby the cutter link is oriented in the grinding position during engagement with the abrasive block.

2. The chain saw according to claim 1 wherein the projections comprise raised steps.

3. The chain saw according to claim 1 wherein the projections comprise sloping ramps.

4. The chain saw according to claim 1 wherein each cutter link is connected to the saw chain by two rivets, a radius from a center of rotation of the sprocket intersecting at ninety degrees a line passing through both of the rivets, the intersection occurring at a location rearward of a midpoint of the cutter link.

\* \* \* \* \*